(12) United States Patent
Hara et al.

(10) Patent No.: US 10,399,211 B2
(45) Date of Patent: Sep. 3, 2019

(54) CHUCK APPARATUS

(71) Applicant: SMC CORPORATION, Chiyoda-ku (JP)

(72) Inventors: Koji Hara, Tsukubamirai (JP); Kouichirou Kanda, Tsukuba (JP); Koichiro Ishibashi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/165,732

(22) Filed: May 26, 2016

(65) Prior Publication Data

US 2016/0368117 A1    Dec. 22, 2016

(30) Foreign Application Priority Data

Jun. 17, 2015   (JP) .................................. 2015-121821

(51) Int. Cl.
| | |
|---|---|
| *B25B 5/06* | (2006.01) |
| *B25B 5/08* | (2006.01) |
| *B23Q 17/00* | (2006.01) |
| *B25J 15/02* | (2006.01) |

(52) U.S. Cl.
CPC ............ *B25B 5/064* (2013.01); *B23Q 17/003* (2013.01); *B25J 15/026* (2013.01); *B25B 5/061* (2013.01); *B25B 5/087* (2013.01)

(58) Field of Classification Search
CPC ........ B25B 5/061; B25B 5/064; B25J 15/026; B25J 15/00; B23B 31/18; Y10T 279/18
USPC ............ 294/119.1; 269/32, 27, 24, 309, 310
See application file for complete search history.

(56) References Cited

U.S. PATENT DOCUMENTS

| | | | | |
|---|---|---|---|---|
| 3,147,993 | A | * | 9/1964 | Broderson .............. B66C 1/427 294/106 |
| 4,483,218 | A | * | 11/1984 | Beck ......................... B25B 1/18 76/78.1 |
| 4,565,400 | A | * | 1/1986 | Nakashima .......... B25J 15/0052 294/103.1 |
| 4,600,357 | A | * | 7/1986 | Coules .................. B25J 13/082 294/106 |

(Continued)

FOREIGN PATENT DOCUMENTS

| | | |
|---|---|---|
| JP | 53-144680 U | 11/1978 |
| JP | 06-278859 A | 10/1994 |

(Continued)

OTHER PUBLICATIONS

Japanese Office Action dated Mar. 12, 2019 in Japanese Patent Application No. 2015-121821 w/ English translation, citing documents, AO-AQ, therein, 7 pages.

*Primary Examiner* — Sean K. Hunter
*Assistant Examiner* — Seahee Yoon
(74) *Attorney, Agent, or Firm* — Oblon, McClelland, Maier & Neustadt, L.L.P.

(57) ABSTRACT

A chuck apparatus includes a first rotating shaft provided with a first gripping member, a second rotating shaft provided with a second gripping member, and a power transmission mechanism configured to convert reciprocating movement of a piston unit into rotational movement of the first rotating shaft and the second rotating shaft. The first rotating shaft and the second rotating shaft are arranged side by side in a direction of displacement of the piston unit.

3 Claims, 8 Drawing Sheets

(56) References Cited

U.S. PATENT DOCUMENTS

| | | | | |
|---|---|---|---|---|
| 4,707,013 A * | 11/1987 | Vranish | .................. | B25J 15/026 294/119.1 |
| 4,752,094 A * | 6/1988 | Tabeau | ................. | B25J 15/0213 294/198 |
| 4,874,194 A * | 10/1989 | Borcea | ................... | B25J 15/026 294/207 |
| 5,904,358 A | 5/1999 | Hosono et al. | | |
| 6,394,521 B1 * | 5/2002 | Bertini | ................... | B25J 15/026 294/119.1 |
| 7,396,059 B2 * | 7/2008 | Maffeis | ................... | B25B 5/061 294/198 |
| 8,061,748 B2 * | 11/2011 | Kipping | .................. | B25B 5/061 294/106 |
| 8,757,690 B2 * | 6/2014 | Gao | ..................... | B25J 15/0213 294/106 |
| 2001/0024045 A1 * | 9/2001 | Bertini | ................... | B25J 15/026 294/119.1 |
| 2015/0021948 A1 * | 1/2015 | Xiao | .................... | B25J 15/0028 294/198 |

FOREIGN PATENT DOCUMENTS

| | | |
|---|---|---|
| JP | 10-80888 | 3/1998 |
| JP | 2789167 | 8/1998 |
| JP | 2006-528562 A | 12/2006 |

* cited by examiner

CHUCK APPARATUS

CROSS-REFERENCE TO RELATED APPLICATION

This application is based upon and claims the benefit of priority from Japanese Patent Application No. 2015-121821 filed on Jun. 17, 2015, the contents of which are incorporated herein by reference.

BACKGROUND OF THE INVENTION

Field of the Invention

The present invention relates to a chuck apparatus that grips and releases a workpiece by causing a piston unit, which is arranged in a cylinder hole formed in a body, to undergo reciprocating movement under the action of a working fluid.

Description of the Related Art

In this type of chuck apparatus, for example, as disclosed in Japanese Patent No. 2789167 and Japanese Laid-Open Patent Publication No. 10-080888, a configuration is provided in which a pair of gripping members that grip a workpiece are juxtaposed or arranged side by side in a direction perpendicular to the direction of displacement of a piston unit. In this type of chuck apparatus, in the case that gripping and releasing of the workpiece is carried out, the workpiece is arranged with respect to a body in a direction of displacement of the piston unit.

SUMMARY OF THE INVENTION

According to the conventional technology of the aforementioned Japanese Patent No. 2789167, since it is necessary for the workpiece to be arranged with respect to the body in the direction of displacement of the piston unit, there is a concern that it may not be possible to arrange the chuck apparatus due to the layout in the factory or the like.

The present invention has been devised taking into consideration the aforementioned problem, and has the object of providing a chuck apparatus, in which it is possible to carry out gripping and releasing of a workpiece that is positioned with respect to a body in a direction perpendicular to the direction of displacement of a piston unit.

In order to achieve the aforementioned object, a chuck apparatus according to the present invention includes a body in which a cylinder hole is formed, a piston unit disposed in the cylinder hole, the piston unit being configured to move reciprocally under the action of a working fluid, a first rotating shaft and a second rotating shaft which are rotatably supported on the body, the first rotating shaft and the second rotating shaft being provided with gripping members configured to grip a workpiece, and a power transmission mechanism configured to convert reciprocating movement of the piston unit into rotational movement of the first rotating shaft and the second rotating shaft, wherein the first rotating shaft and the second rotating shaft are arranged side by side in a direction of displacement of the piston unit.

In accordance with such a configuration, since the first rotating shaft and the second rotating shaft provided with the gripping members for gripping the workpiece are arranged side by side in the direction of displacement of the piston unit, it is possible to perform gripping and releasing of the workpiece that is positioned with respect to the body in a direction perpendicular to the direction in which the piston unit is displaced.

In the above-described chuck apparatus, the power transmission mechanism may include a rack disposed on the piston unit, a first pinion disposed on the first rotating shaft, the first pinion being configured to be placed in meshing engagement with the rack, and a second pinion disposed on the second rotating shaft, the second pinion being configured to be placed in meshing engagement with the first pinion in a state of not being meshed with the rack.

In accordance with this configuration, the chuck apparatus can be constructed compactly, and it is possible for the first rotating shaft and the second rotating shaft to be rotated reliably.

In the above-described chuck apparatus, the first pinion may be formed to be longer than the second pinion.

In accordance with this configuration, with a simple structure, the second pinion can be made not to mesh with the rack.

In the above-described chuck apparatus, the piston unit may include a pair of piston units disposed along an axial direction of the first rotating shaft, and the power transmission mechanism may include a first rack disposed on one of the piston units, a second rack disposed on another of the piston units, a first pinion disposed on the first rotating shaft, the first pinion being configured to be placed in meshing engagement with the first rack, and a second pinion disposed on the second rotating shaft, the second pinion being configured to be placed in meshing engagement with the second rack.

In this configuration, the gripping force of the workpiece can be increased, while the dimension of the body in a direction (the direction in which the body and the workpiece are arranged) perpendicular to the direction of displacement of the piston unit and to the axial direction of the first rotating shaft can be made compact.

In the above-described chuck apparatus, the first pinion and the second pinion may be mutually meshed with each other.

In accordance with this configuration, with a simple structure, the operation to rotate the first rotating shaft and the operation to rotate the second rotating shaft can be synchronized.

In the above-described chuck apparatus, the first pinion and the second pinion may not be mutually meshed with each other.

In accordance with this configuration, with a simple structure, the gripping member provided on the first rotating shaft and the gripping member provided on the second rotating shaft can be individually rotated.

According to the present invention, since the first rotating shaft and the second rotating shaft provided with the gripping members for gripping the workpiece are arranged side by side in the direction of displacement of the piston unit, it is possible to perform gripping and releasing of the workpiece that is positioned with respect to the body in a direction perpendicular to the direction in which the piston unit is displaced.

The above and other objects, features and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Below, preferred embodiments of a chuck apparatus according to the present invention will be described with reference to the accompanying drawings.

First Embodiment

A chuck apparatus 10A according to the present embodiment is an apparatus that carries out gripping and releasing of a workpiece W by rotating a pair of gripping members (a first gripping member 18a and a second gripping member 18b) under the action of a fluid pressure cylinder.

Figure 1:
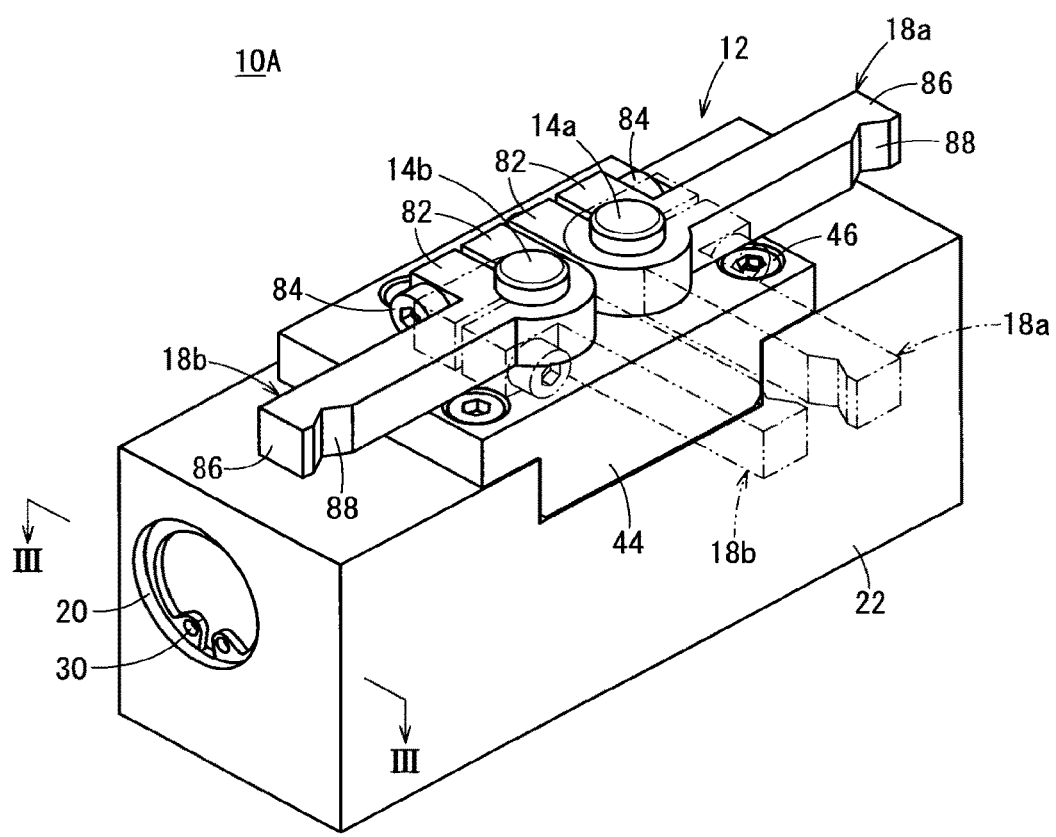
FIG. 1 is a perspective view of a chuck apparatus according to a first embodiment of the present invention.
Figure 2:
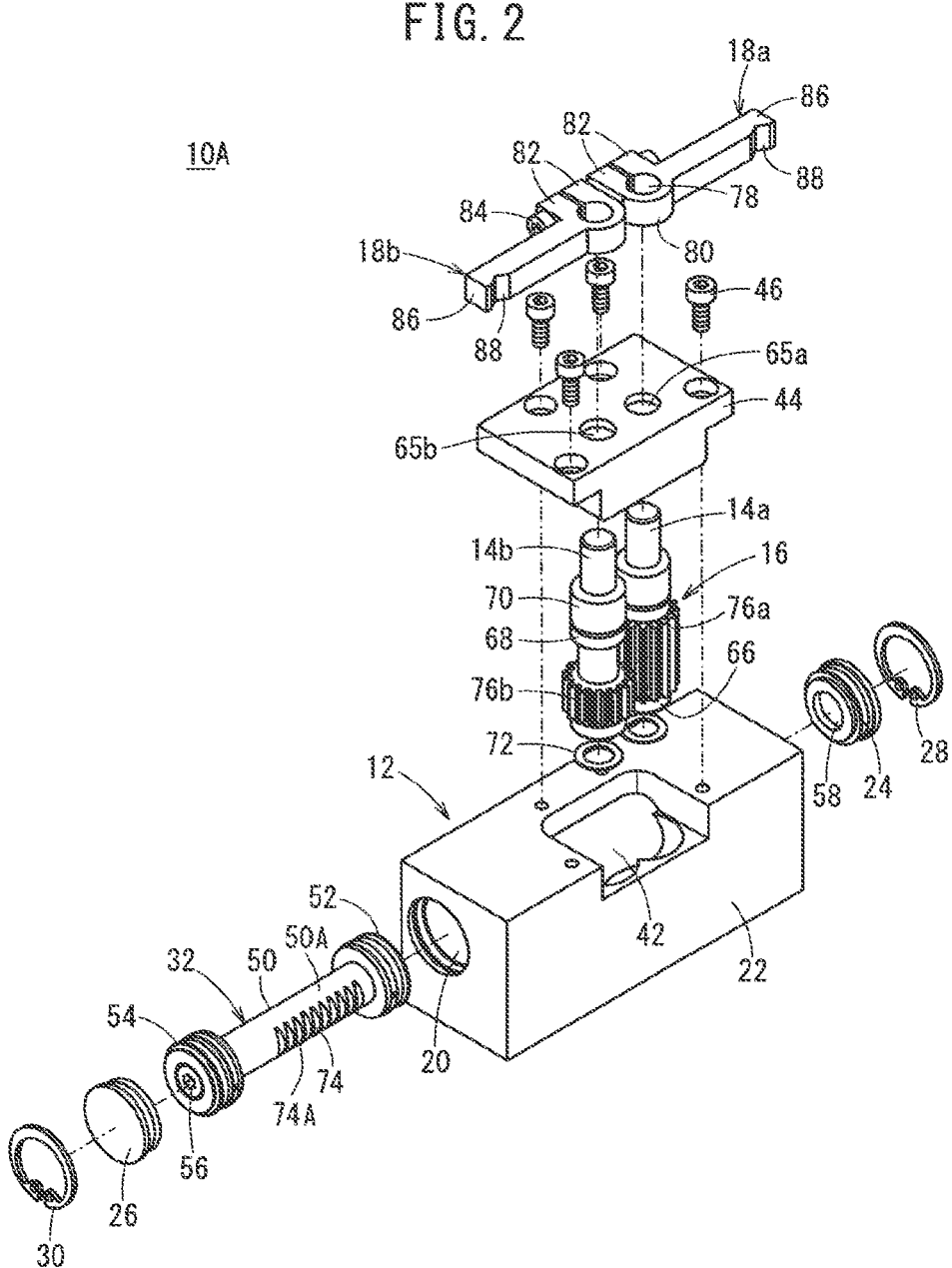
FIG. 2 is an exploded perspective view of the chuck apparatus shown in FIG. 1.
Figure 3:
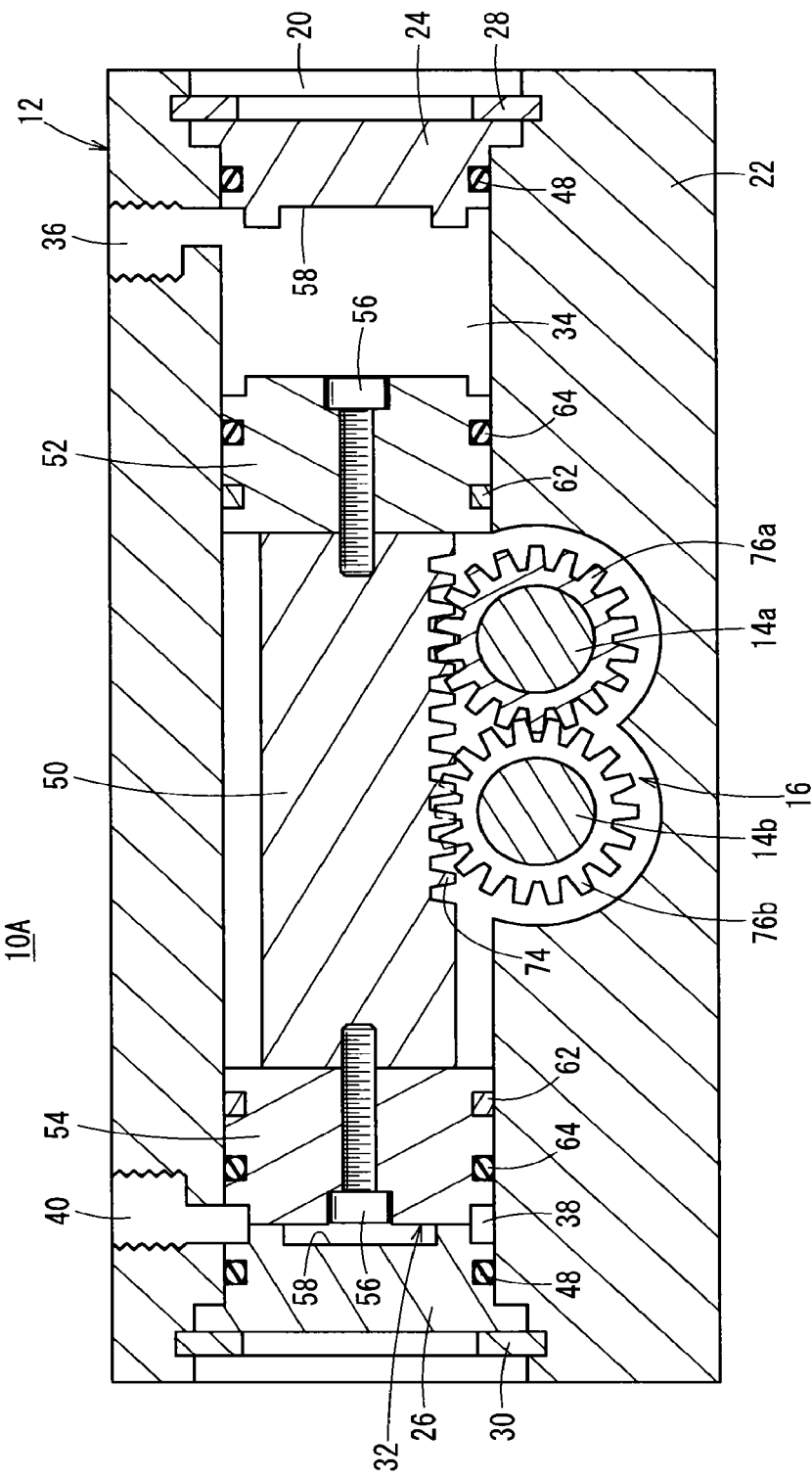
FIG. 3 is a cross-sectional view taken along line III-III of FIG. 1.

As shown in FIGS. 1 through 3, the chuck apparatus 10A is equipped with a cylinder unit 12, a first rotating shaft 14a and a second rotating shaft 14b disposed on the cylinder unit 12, a power transmission mechanism 16 that transmits a drive power of the cylinder unit 12 to the first rotating shaft 14a and the second rotating shaft 14b, a first gripping member 18a disposed on the first rotating shaft 14a, and a second gripping member 18b disposed on the second rotating shaft 14b.

The cylinder unit 12 includes a body 22 in the shape of a rectangular parallelepiped and in which a cylinder hole 20 is formed to penetrate therethrough, a pair of caps 24, 26 that close and seal openings on both sides of the cylinder hole 20, a pair of retaining rings 28, 30 that prevent the caps 24, 26 from falling out from the cylinder hole 20, and a piston unit 32 arranged in the cylinder hole 20 so as to reciprocate therein.

Although the body 22 can be constituted from any arbitrary material, the body 22 is constituted, for example, from a metal material such as an aluminum alloy or an iron alloy. In the body 22, there are formed a first port 36 that communicates with a first cylinder chamber 34 formed between the piston unit 32 and one of the caps 24, and a second port 40 that communicates with a second cylinder chamber 38 formed between the piston unit 32 and the other of the caps 26. Non-illustrated tubes (air tubes) for supplying or discharging a working fluid (compressed fluid) for driving the piston unit 32 are connected respectively to the first port 36 and the second port 40.

In the body 22, an accommodating hole 42 is formed, which communicates with the cylinder hole 20, and in which the power transmission mechanism 16, the first rotating shaft 14a, and the second rotating shaft 14b are arranged. The accommodating hole 42 opens in the center in the lengthwise direction of the body 22, and a cover member 44, which closes the opening thereof, is fastened with respect to the body 22 by a plurality of fixing screws 46.

The cylinder hole 20 is expanded in diameter at positions on both ends of the body 22, and the caps 24, 26 and the retaining rings 28, 30 are arranged in the expanded diameter portions thereof. Annular grooves in which ring-shaped sealing members 48 can be mounted are formed on outer circumferential surfaces of the respective caps 24, 26. The retaining rings 28, 30 are formed in C-shapes, and are installed in annular grooves that are formed on inner circumferential surfaces of the cylinder hole 20.

The piston unit 32 includes a cylindrical rod 50 that extends along the cylinder hole 20, and a pair of pistons 52, 54 disposed on both end surfaces of the rod 50. The respective pistons 52, 54 are connected with respect to the rod 50 by connecting bolts 56. Head portions of the connecting bolts 56 are disposed face-to-face respectively with bottom surfaces of recesses 58 that are formed on inner surfaces of the caps 24, 26. Owing thereto, the connecting bolts 56 can suitably be prevented from coming into contact with the caps 24, 26. The pistons 52, 54 and the rod 50 may be formed in an integral manner.

In each of the pistons 52, 54, there are formed an annular groove in which a ring-shaped wear ring 62 is mounted, and another annular groove in which a ring-shaped packing 64 is mounted. Each of the pistons 52, 54 may have a shock absorbing damper which is disposed on an end surface thereof on the opposite side from the rod 50. The dampers, for example, can be constituted from a resilient material such as rubber or the like. Such dampers may also be provided on inner surfaces of the respective caps 24, 26.

The first rotating shaft 14a and the second rotating shaft 14b, in a state of being positioned in the accommodating hole 42 of the body 22, are arranged side by side in a direction of displacement of the piston unit 32 (the longitudinal direction of the body 22). The first gripping member 18a is mounted on an end of the first rotating shaft 14a that is exposed outside of the body 22 through an insertion hole 65a of the cover member 44. The second gripping member 18b is mounted on an end of the second rotating shaft 14b that is exposed outside of the body 22 through an insertion hole 65b of the cover member 44.

Each of the first rotating shaft 14a and the second rotating shaft 14b is pivotally supported by a bearing 66 that is anchored to the body 22, and by two bearings 68, 70 that are arranged in each of the insertion holes 65a, 65b of the cover member 44. The bearings 66 are preloaded by wave washers 72. As a result, the first rotating shaft 14a and the second rotating shaft 14b are supported rotatably with respect to the body 22.

The power transmission mechanism 16 converts the reciprocating movement of the piston unit 32 into rotational movement of the first rotating shaft 14a and the second rotating shaft 14b. The power transmission mechanism 16 includes a rack 74 formed on an outer circumferential surface of the rod 50, a first pinion 76a fixed to the first rotating shaft 14a and which is placed in meshing engagement with the rack 74, and a second pinion 76b fixed to the second rotating shaft 14b and which is placed in meshing engagement with the first pinion 76a in a state of not being meshed with the rack 74. The rack 74 is formed as a longitudinally extending series of grooves 74A, each groove extending into the rod 50 from the cylindrical peripheral surface 50A of the rod.

Figure 4:
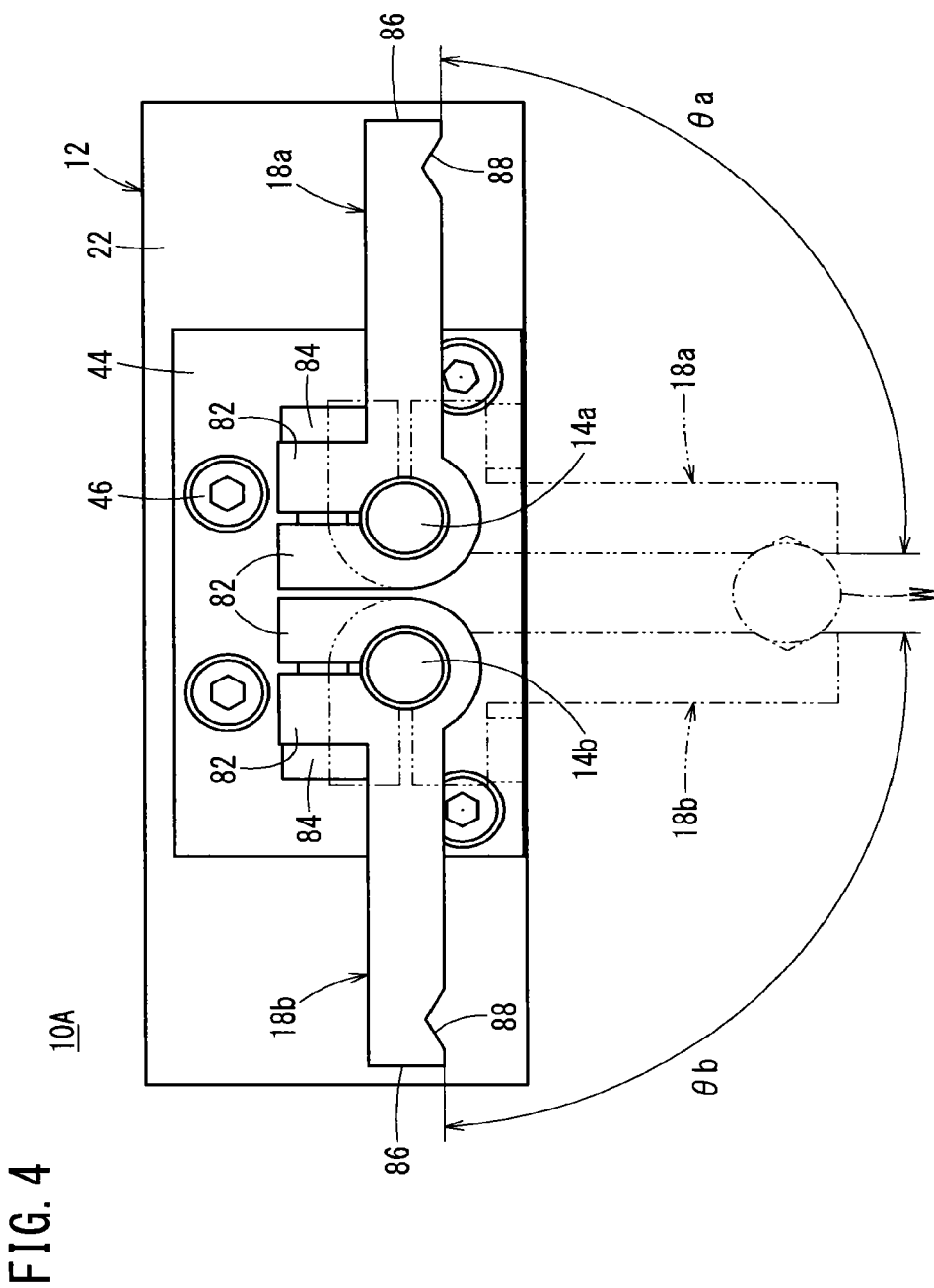
FIG. 4 is a plan view of the chuck apparatus shown in FIG. 1.

The rack 74 extends from one end of the rod 50 up to a position thereon that is slightly shifted toward the other end side from the central position of the rod 50 in the lengthwise direction. In other words, the rack 74 is not formed on the other end side of the rod 50. In the present embodiment, the length of the rack 74 and the stroke of the piston unit 32 are set such that the range of angular rotation θa of the first rotating shaft 14a (first gripping member 18a) and the range of angular rotation θb of the second rotating shaft 14b (second gripping member 18b) are both 90° (see FIG. 4). However, the ranges of angular rotation θa, θb can be set arbitrarily.

The first pinion 76a is formed to be longer than the second pinion 76b. Stated otherwise, the second pinion 76b is formed to be shorter than the first pinion 76a, and is disposed at a position so as not to come into contact with the rack 74. As a result, with a simple structure, the second pinion 76b can be made not to mesh with the rack 74.

The first gripping member 18a includes an attachment section 80 having an insertion hole 78 into which an end of the first rotating shaft 14a is inserted, a pair of projecting sections 82 that project out from the attachment section 80 in a direction perpendicular to the axis of the first rotating shaft 14a so as to be face-to-face with each other, a locking screw 84 that adjusts the interval between the pair of projecting sections 82, and a square pillar-shaped finger section 86 that extends in a straight line from the attachment section 80.

The first gripping member 18a as constructed above is fixed with respect to the first rotating shaft 14a by tightening the locking screw 84 in a state with the end of the first rotating shaft 14a being inserted through the insertion hole 78. Further, fixing of the first gripping member 18a with respect to the first rotating shaft 14a is released by loosening the fastened condition of the locking screw 84. More specifically, the first gripping member 18a is capable of being attached and detached with respect to the end of the first rotating shaft 14a. A gripping surface 88 that contacts the workpiece W is formed in a recessed shape on a distal end of the finger section 86 on a side opposite to the attachment section 80.

The second gripping member 18b is capable of being attached and detached with respect to the end of the second rotating shaft 14b, but otherwise, is of the same structure as the first gripping member 18a. Therefore, detailed description of the second gripping member 18b is omitted.

The chuck apparatus 10A according to the present embodiment is constructed basically as described above. Next, operations and advantageous effects of the chuck apparatus 10A will be explained. In the following description, the state of the first gripping member 18a and the second gripping member 18b shown in FIG. 4 will be referred to as an initial condition. In the initial condition, the piston unit 32 is in contact with the cap 26, whereas the finger section 86 of the first gripping member 18a and the finger section 86 of the second gripping member 18b extend along the direction of displacement of the piston unit 32.

First, by a non-illustrated transport device or the like, a cylindrical workpiece W is supplied (transported) with respect to the body 22 to a predetermined position in a direction perpendicular to the axial direction of the first rotating shaft 14a and also to the direction of displacement of the piston unit 32. When the workpiece W is transported to the predetermined position, a working fluid is supplied to the second port 40 in a state with the first port 36 open to atmosphere.

Upon doing so, under an action of the working fluid that was supplied to the second cylinder chamber 38, the piston unit 32 is displaced toward the cap 24. At this time, the first pinion 76a that is meshed with the rack 74 and the first rotating shaft 14a are rotated clockwise as viewed from the side of the first gripping member 18a, and therefore, the first gripping member 18a is rotated in a clockwise direction about the axis of the first rotating shaft 14a. Further, the second pinion 76b that is meshed with the first pinion 76a and the second rotating shaft 14b are rotated counterclockwise as viewed from the side of the second gripping member 18b, and therefore, the second gripping member 18b is rotated in a counterclockwise direction about the axis of the second rotating shaft 14b.

In addition, the gripping surface 88 of the first gripping member 18a and the gripping surface 88 of the second gripping member 18b contact the workpiece W, whereby the workpiece W is gripped (retained) with a predetermined gripping force, and the piston unit 32 is stopped.

In the case that gripping of the workpiece W by the chuck apparatus 10A is to be released, the working fluid is supplied to the first port 36 in a state with the second port 40 open to atmosphere. Upon doing so, under an action of the working fluid that was supplied to the first cylinder chamber 34, the piston unit 32 is displaced toward the cap 26.

At this time, the first pinion 76a that is meshed with the rack 74, and the first rotating shaft 14a are rotated counterclockwise as viewed from the side of the first gripping member 18a, and therefore, the first gripping member 18a is rotated in a counterclockwise direction about the axis of the first rotating shaft 14a. Further, the second pinion 76b that is meshed with the first pinion 76a, and the second rotating shaft 14b are rotated clockwise as viewed from the side of the second gripping member 18b, and therefore, the second gripping member 18b is rotated in a clockwise direction about the axis of the second rotating shaft 14b.

Consequently, since the gripping surface 88 of the first gripping member 18a and the gripping surface 88 of the second gripping member 18b separate away from the workpiece W, gripping of the workpiece W by the chuck apparatus 10A is released. In addition, by the piston unit 32 coming into contact with the cap 26, displacement of the piston unit 32 is stopped.

According to the present embodiment, since the first rotating shaft 14a and the second rotating shaft 14b are arranged side by side in the direction of displacement of the piston unit 32, it is possible to perform gripping and releasing of the workpiece W that is positioned with respect to the body 22 in a direction perpendicular to the direction in which the piston unit 32 is displaced.

Further, according to the present embodiment, the rack 74 is formed on the rod 50, the first pinion 76a, which meshes with the rack 74, is provided on the first rotating shaft 14a, and the second pinion 76b, which meshes with the first pinion 76a in a state of not being meshed with the rack 74, is provided on the second rotating shaft 14b. Therefore, the chuck apparatus 10A can be constructed compactly, and it is possible for the first rotating shaft 14a and the second rotating shaft 14b to be rotated reliably.

The chuck apparatus 10A according to the present embodiment is not limited to the configuration described above. For example, a non-illustrated magnet (permanent magnet) may be mounted on an outer circumferential surface of the piston 52 or the piston 54 of the piston unit 32. In this case, a non-illustrated magnetic sensor, which detects magnetism from the magnet, is disposed on the body 22. In accordance with such a configuration, the magnetism that is generated by the magnet is sensed by the magnetic sensor, whereby the position of the piston unit 32 (the positions of the first gripping member 18a and the second gripping member 18b) can be detected.

Second Embodiment

Next, a chuck apparatus 10B according to a second embodiment of the present invention will be described with reference to FIGS. 5 through 8. In the chuck apparatus 10B according to the second embodiment, constituent elements thereof, which are the same as those of the chuck apparatus 10A according to the first embodiment, are denoted by the same reference characters, and detailed description of such features is omitted.

Figure 5:
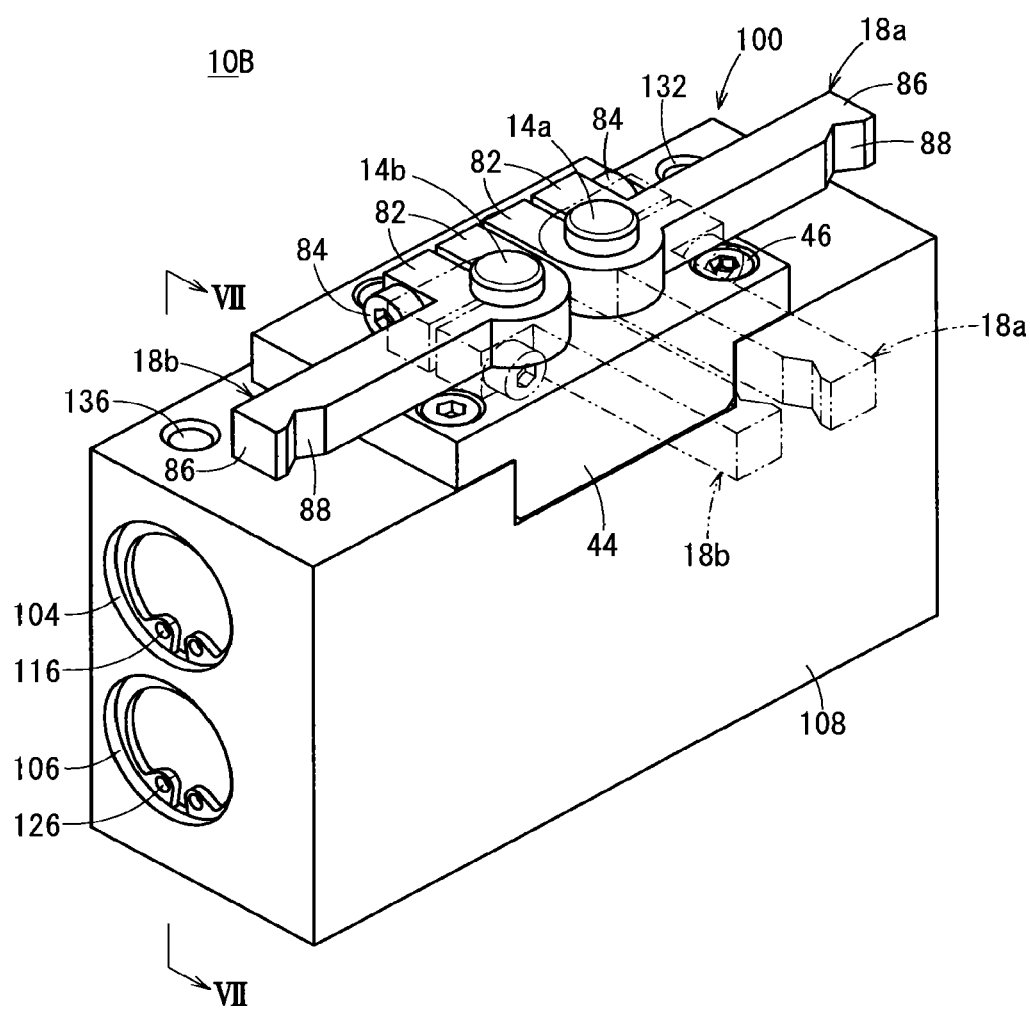
FIG. 5 is a perspective view of a chuck apparatus according to a second embodiment of the present invention.
Figure 6:
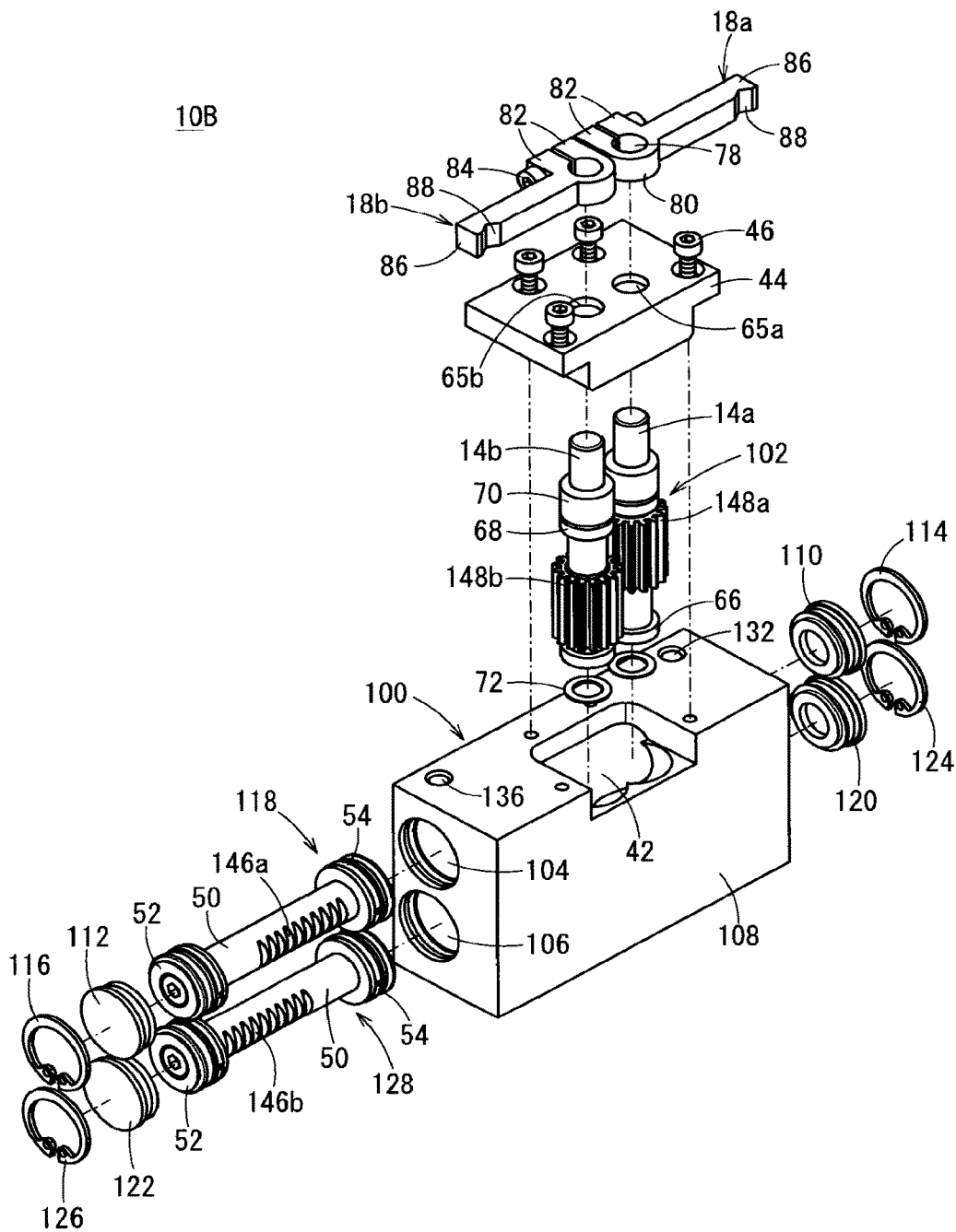
FIG. 6 is an exploded perspective view of the chuck apparatus shown in FIG. 5.
Figure 7:
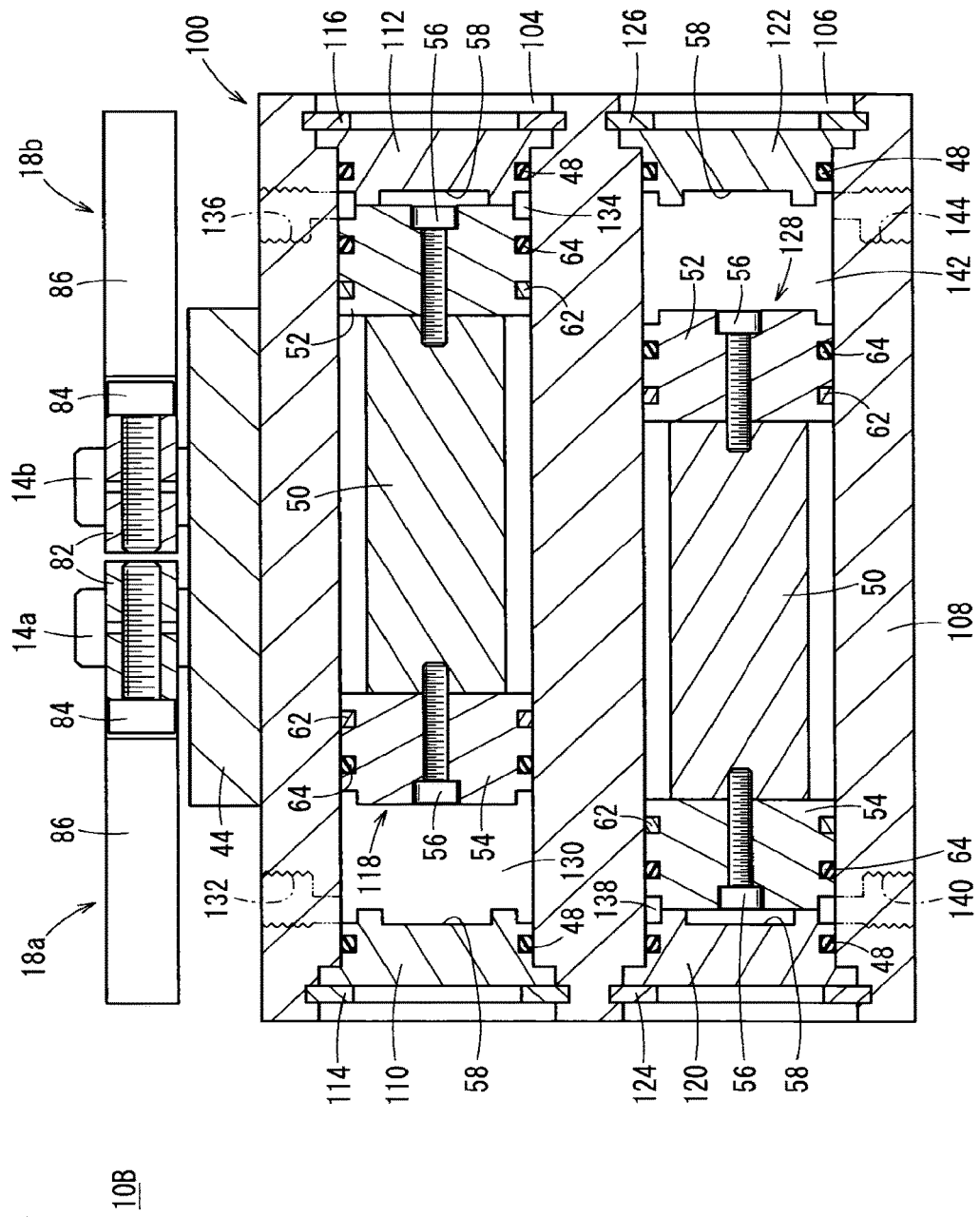
FIG. 7 is a cross-sectional view taken along line VII-VII of FIG. 5.

As shown in FIGS. 5 through 7, in the chuck apparatus 10B according to the present embodiment, the structures of the cylinder unit 100 and the power transmission mechanism 102 differ from the aforementioned structures of the cylinder unit 12 and the power transmission mechanism 16. The cylinder unit 100 comprises a body 108 in the form of a rectangular parallelepiped. In the body 108, a first cylinder hole 104 and a second cylinder hole 106 are formed so as to penetrate through the body 108. The first cylinder hole 104 and the second cylinder hole 106 extend in the longitudinal direction of the body 108, and are arranged side by side in the axial direction of the first rotating shaft 14a.

Further, the cylinder unit 100 includes a pair of first caps 110, 112 that close and seal openings on both sides of the first cylinder hole 104, a pair of first retaining rings 114, 116 that prevent the first caps 110, 112 from falling out from the first cylinder hole 104, a first piston unit 118 arranged in the first cylinder hole 104 so as to reciprocate therein, a pair of second caps 120, 122 that close and seal openings on both sides of the second cylinder hole 106, a pair of second retaining rings 124, 126 that prevent the second caps 120, 122 from falling out from the second cylinder hole 106, and a second piston unit 128 arranged in the second cylinder hole 106 so as to reciprocate therein.

The first caps 110, 112 and the second caps 120, 122 are formed in the same manner as the above-described cap 24, the first retaining rings 114, 116 and the second retaining rings 124, 126 are formed in the same manner as the above-described retaining ring 28, and the first piston unit 118 and the second piston unit 128 are formed in the same manner as the above-described piston unit 32. Therefore, detailed description of the structures of the first caps 110, 112, the second caps 120, 122, the first retaining rings 114, 116, the second retaining rings 124, 126, the first piston unit 118, and the second piston unit 128 will be omitted.

As shown in FIG. 7, in the body 108, there are formed a first port 132 that communicates with a first cylinder chamber 130 formed between the first piston unit 118 and the first cap 110, a second port 136 that communicates with a second cylinder chamber 134 formed between the first piston unit 118 and the first cap 112, a third port 140 that communicates with a third cylinder chamber 138 formed between the second piston unit 128 and the second cap 120, and a fourth port 144 that communicates with a fourth cylinder chamber 142 formed between the second piston unit 128 and the second cap 122.

As shown in FIG. 6, the power transmission mechanism 102 includes a first rack 146a formed on an outer circumferential surface of the rod 50 of the first piston unit 118, a second rack 146b formed on an outer circumferential surface of the rod 50 of the second piston unit 128, a first pinion 148a fixed to the first rotating shaft 14a and which is placed in meshing engagement with the first rack 146a, and a second pinion 148b fixed to the second rotating shaft 14b and which is placed in meshing engagement with the second rack 146b and the first pinion 148a.

The first rack 146a is constituted in the same manner as the aforementioned rack 74. The second rack 146b extends on the rod 50 of the second piston unit 128 from a position that is slightly shifted toward one end side of the rod 50 from the central position of the rod 50 in the lengthwise direction, up to the other end. In other words, the second rack 146b is not formed on the one end side of the rod 50 of the second piston unit 128. The first pinion 148a is not meshed with the second rack 146b, and the second pinion 148b is not meshed with the first rack 146a.

Next, operations and advantageous effects of the chuck apparatus 10B according to the present embodiment will be explained. In an initial condition, the first piston unit 118 contacts the first cap 112, and the second piston unit 128 contacts the second cap 120.

According to the present embodiment, when the workpiece W is transported to a predetermined position, a working fluid is supplied to the second port 136 in a state with the first port 132 open to atmosphere, and the working fluid is supplied to the third port 140 in a state with the fourth port 144 open to atmosphere.

Upon doing so, under an action of the working fluid that was supplied to the second cylinder chamber 134, the first piston unit 118 is displaced toward the first cap 110, and under an action of the working fluid that was supplied to the third cylinder chamber 138, the second piston unit 128 is displaced toward the second cap 122. At this time, the first pinion 148a that is meshed with the first rack 146a, and the first rotating shaft 14a are rotated clockwise as viewed from the side of the first gripping member 18a, and the second pinion 148b that is meshed with the second rack 146b, and the second rotating shaft 14b are rotated counterclockwise as viewed from the side of the second gripping member 18b.

Further, because the first pinion 148a and the second pinion 148b are mutually meshed with each other, the rotating operation of the first rotating shaft 14a and the rotating operation of the second rotating shaft 14b are synchronized. Stated otherwise, the first rotating shaft 14a and the second rotating shaft 14b rotate simultaneously in opposite directions mutually by the same angle. In addition, the gripping surface 88 of the first gripping member 18a and the gripping surface 88 of the second gripping member 18b contact the workpiece W, whereby the workpiece W is gripped (retained) with a predetermined gripping force.

According to the present embodiment, the first piston unit 118 and the second piston unit 128 are arranged side by side in the axial direction of the first rotating shaft 14a, the first gripping member 18a is rotated by the reciprocal movement of the first piston unit 118, and the second gripping member 18b is rotated by the reciprocal movement of the second piston unit 128. Consequently, the gripping force of the workpiece W can be increased, while the dimension of the body 108 in a direction (the direction in which the body 108 and the workpiece W are arranged) perpendicular to the direction of displacement of the first piston unit 118 and to the axial direction of the first rotating shaft 14a can be made compact.

The chuck apparatus 10B according to the present embodiment is not limited to the configuration described above. For example, a non-illustrated magnet (permanent magnet) may be mounted on an outer circumferential surface of the piston 52 or the piston 54 of the first piston unit 118, or alternatively, may be mounted on an outer circumferential surface of the piston 52 or the piston 54 of the second piston unit 128. In this case, a non-illustrated magnetic sensor, which detects magnetism from the magnet, is disposed on the body 108. In accordance with such a configuration, the magnetism that is generated by the magnet is sensed by the magnetic sensor, whereby the position of the first piston unit 118 or the second piston unit 128 (the positions of the first gripping member 18a and the second gripping member 18b) can be detected.

Figure 8:
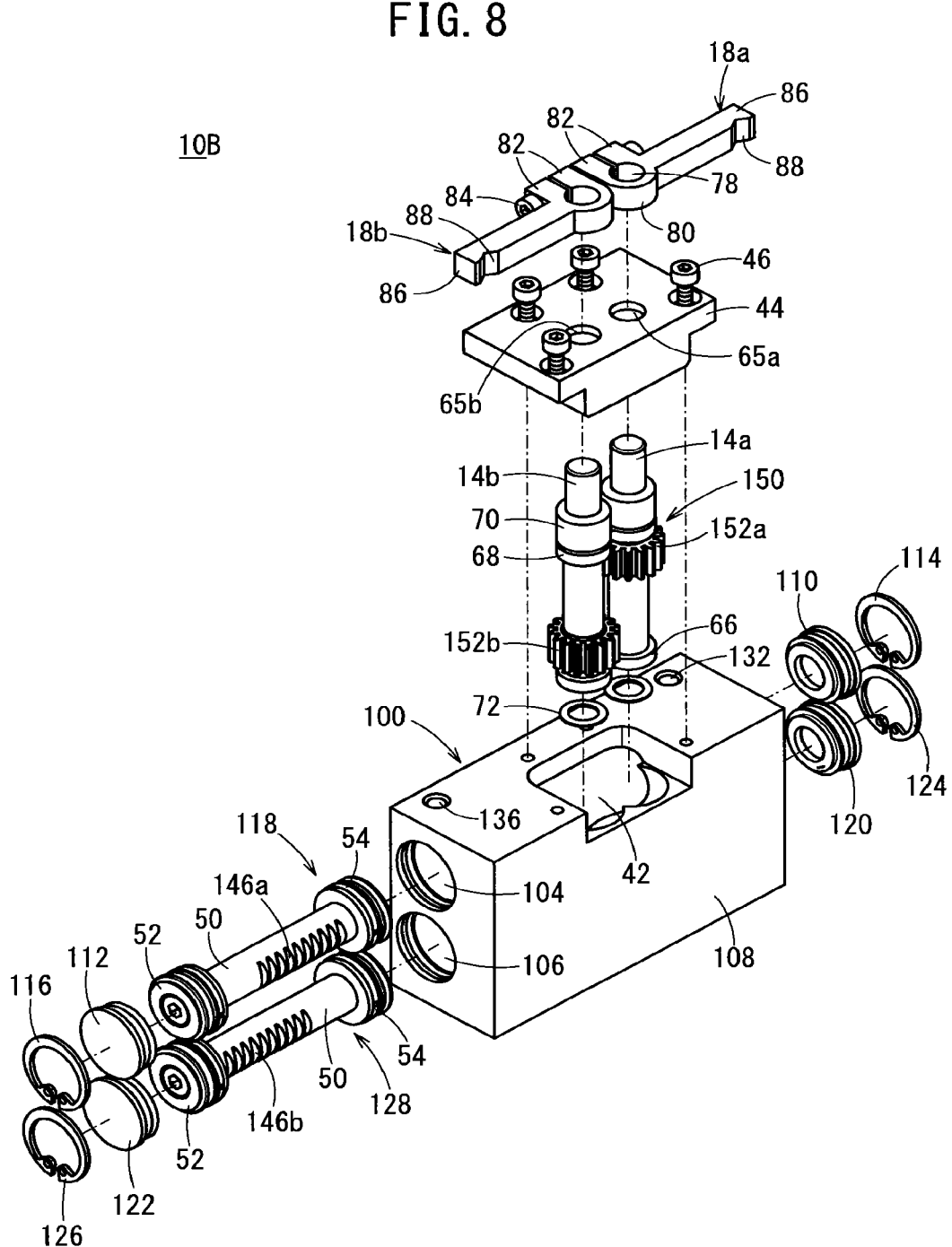
FIG. 8 is an exploded perspective view of a chuck apparatus equipped with a power transmission mechanism according to a modification.

Further, for example, instead of the power transmission mechanism 102, the chuck apparatus 10B may be equipped with a power transmission mechanism 150 according to a modification shown in FIG. 8. As shown in FIG. 8, the power transmission mechanism 150 includes a first pinion 152a, which is placed in meshing engagement with the first rack 146a, and a second pinion 152b, which is placed in meshing engagement with the second rack 146b in a state of not being meshed with the first pinion 152a. More specifically, the first pinion 152a and the second pinion 152b are not mutually meshed with each other. In this case, with a simple structure, the first gripping member 18a and the second gripping member 18b can be individually rotated.

Furthermore, in the case that the chuck apparatus 10B is equipped with the above-described power transmission mechanism 150, a non-illustrated first magnet may be mounted on the piston 52 or the piston 54 of the first piston unit 118, and a non-illustrated second magnet may be mounted on the piston 52 or the piston 54 of the second piston unit 128. In this case, a non-illustrated first magnetic sensor, which detects magnetism from the first magnet, and a non-illustrated second magnetic sensor, which detects magnetism from the second magnet are disposed on the body 108. In accordance with such a configuration, the magnetism that is generated by the first magnet is sensed by the first magnetic sensor, whereby the position of the first piston unit 118 (the position of the first gripping member 18a) can be detected. Further, the magnetism that is generated by the second magnet is sensed by the second magnetic sensor, whereby the position of the second piston unit 128 (the position of the second gripping member 18b) can be detected.

The chuck apparatus according to the present invention is not limited to the embodiments described above, and it goes without saying that various configurations could be adopted therein without deviating from the scope of the present invention as defined by the appended claims. For example, the chuck apparatus does not necessarily have the first gripping member and the second gripping member. Stated otherwise, depending on the shape of the workpiece or the like, the first gripping member and the second gripping member may be appropriately removed and replaced (detached and attached) with respect to the chuck apparatus.

What is claimed is:

1. A chuck apparatus comprising:
    a body in which a cylinder hole is formed;
    a piston unit disposed in the cylinder hole, the piston unit being configured to move reciprocally under an action of a working fluid, and including a rod and first and second pistons respectively mounted to opposite ends of the rod along a length of the rod;
    a first rotating shaft and a second rotating shaft which are rotatably supported on the body, the first rotating shaft and the second rotating shaft being provided with gripping members configured to grip a workpiece; and
    a power transmission mechanism configured to convert reciprocating movement of the piston unit into rotational movement of the first rotating shaft and the second rotating shaft,
    wherein the power transmission mechanism includes
        a rack formed on an outer circumferential surface of the rod;
        a first pinion disposed within the body and on the first rotating shaft, the first pinion being configured to be placed in meshing engagement with the rack; and
        a second pinion disposed within the body and on the second rotating shaft, the second pinion being configured to be placed in direct meshing engagement with the first pinion in a state of not being meshed with the rack, wherein
    the first rotating shaft and the second rotating shaft are arranged side by side in a direction of displacement of the piston unit,
    an outer diameter of the rod is smaller than an outer diameter of the first piston and an outer diameter of the second piston,
    the first pinion is located between the first piston and the second pinion,
    the rack extends along the length of the rod to have a first rack end facing the first piston and a second rack end facing the second piston, and
    a distance along the length of the rod from the first piston to the first rack end facing the first piston is smaller than a distance along the length of the rod from the second piston to the second rack end facing the second piston such that the rack is not present at the end of the rod having the second piston.

2. The chuck apparatus according to claim 1, wherein the first pinion is a single first pinion, and
    the first pinion is formed to be longer than the second pinion.

3. The chuck apparatus according to claim 1, wherein the rack comprises a longitudinally extending series of grooves, each of said grooves extending into the rod from the outer circumferential surface of the rod.

* * * * *